Aug. 8, 1967   M. A. STICKELBER   3,334,873
CONTINUOUS MIXER

Filed Aug. 14, 1964   2 Sheets-Sheet 1

INVENTOR.
MERLIN A. STICKELBER
BY Alfred R. Fuchs
ATTORNEY

INVENTOR.
MERLIN A. STICKELBER
BY Alfred R. Fuchs
ATTORNEY

United States Patent Office 3,334,873
Patented Aug. 8, 1967

3,334,873
CONTINUOUS MIXER
Merlin A. Stickelber, Kansas City, Mo., assignor to Stickelber & Sons, Inc., a corporation of Missouri
Filed Aug. 14, 1964, Ser. No. 389,599
2 Claims. (Cl. 259—6)

My invention relates to mixing devices and more particularly to a continuous mixer that is particularly adapted for the continuous mixing of dough.

In mixing dough it is highly important that the mixer exerts a pulling action on the dough that is being mixed, because this pulling action is necessary in order to properly develop the gluten in the dough. The greater the pulling action of the mixer the more satisfactory it is in mixing a dough. While my mixer is adapted for the continuous mixing of other materials than dough mixtures, it is particularly adapted for use in connection with the mixing of dough mixtures because it is capable of exerting a very great amount of pulling action on the contents of the mixer in order to obtain the gluten development above referred to.

In order to provide a mixer that is particularly adapted for the continuous mixing of dough, it is the purpose of my invention to provide a tubular casing of considerable length relative to its diameter, which has a continuously open inlet leading into one end thereof and a continuously open outlet leading from the other end thereof, which casing is made up of a pair of partially cylindrical wall portions which are closed except for the inlet and outlet openings and which meet along the center line of the casing, to form a ridge at the top and bottom of the inside of the casing running midway the length thereof. Each of the cylindrical wall portions is curved about the same radius and these two cylindrical wall portions have their axes of curvature located less than twice the radius from each other so that the above mentioned meeting of the two cylindrical wall portions in a ridge is obtained. Each of the cylindrical wall portions is provided with mixing apparatus comprising a shaft extending lengthwise of the casing each located on the axis about which said cylindrical wall portion is curved, from which rods extend radially outwardly in spaced relation lengthwise and circumferentially of the shaft, with ends of the rods in closely spaced relation to the cylindrical wall portions, the rods projecting from each of the shafts so as to be out of transverse alignment with the rods projecting from the other shaft and each rod on one shaft passing between a pair of rods on the other shaft, in relatively close adjacency thereto but out of contact therewith.

It is a further purpose of my invention to provide a mixer in which the agitating means is of sturdy construction so as to withstand the forces exerted thereon by the pulling action that is exerted by the rod-like members on the dough, and to provide a mixing chamber and agitating means that are so related that the agitating means in the form of rods will either be pulling on the dough by cooperative action of other rods between which each rod passes or by cooperation with the surface of the cylindrical wall portions within which the agitating means is located. The arrangement is preferably such that as soon as any one of the rod-like members leaves the position between a pair of adjacent rod-like members to exert a pulling action on the dough, it will move with its end into adjacency with one of the cylindrically curved wall portions, so as to exert a pulling action on the dough by the cooperative action of the end of the rod-like member and the adjacent cylindrical wall portion. Similarly as soon as any one of the pins leaves the adjacency of the cylindrical wall portion with which it is cooperating to exert a pulling action on the dough, it moves between a pair of rods on the other shaft in order to cooperate therewith to exert the desired pulling action. Accordingly there is a continuous pulling action on all portions of the dough within the chamber provided by the pair of cylindrical wall portions of the casing, at all times, from the entrance of the mixture into the casing at the inlet end thereof to the discharge thereof at the outlet end of said casing.

It is a further purpose of my invention to provide a continuous mixer of the above mentioned character in which the tubular casing is substantially horizontally disposed, the central ridges are located along the top and bottom of the casing, and the inlet leads into the top of the casing while the outlet leads from the bottom of the casing, and in which the rods are circular in cross section. It is highly desirable that the rods be circular in cross section so that there is no surface provided in the agitating means that might provide a pocket in which some of the dough might lodge. The circular in cross section rod-like agitating members are self cleaning.

It is a further purpose of my invention to provide such an arrangement of the rod-like agitating members on the shaft that they will cooperate to jointly convey the mass of material that is being mixed gradually from the inlet to the outlet, this being accomplished by providing the rod-like members on each of the shafts in such positions that they are in a spiral path around each of the shafts which spiral path advances or turns in a direction to advance the material in the mixer from the inlet toward the outlet by the turning of the shaft.

In order that the rod-like agitating members also act as pulling means for exerting the pulling action on the dough, it is necessary that these travel in opposite directions to each other when they are passing each other. In order to accomplish this movement of the agitating rods the two shafts upon which the same are mounted rotate in the same direction.

The rod-like agitating means in acting on the contents of the mixer, particularly due to its exerting the pulling action on the dough, generates considerable heat. As it is undersirable to have the temperature of the contents of the mixer exceed 80° F., because higher temperatures interfere with gluten development in dough, it is an important purpose of my invention to provide means for cooling the contents of the mixer by cooling the walls thereof by suitable cooling apparatus.

Other objects and advantages of my invention will appear as the description of the drawings proceeds. However, I desire to have it understood that I do not intend to limit myself to the particular details shown or described, except as defined in the claims.

Figure 2:
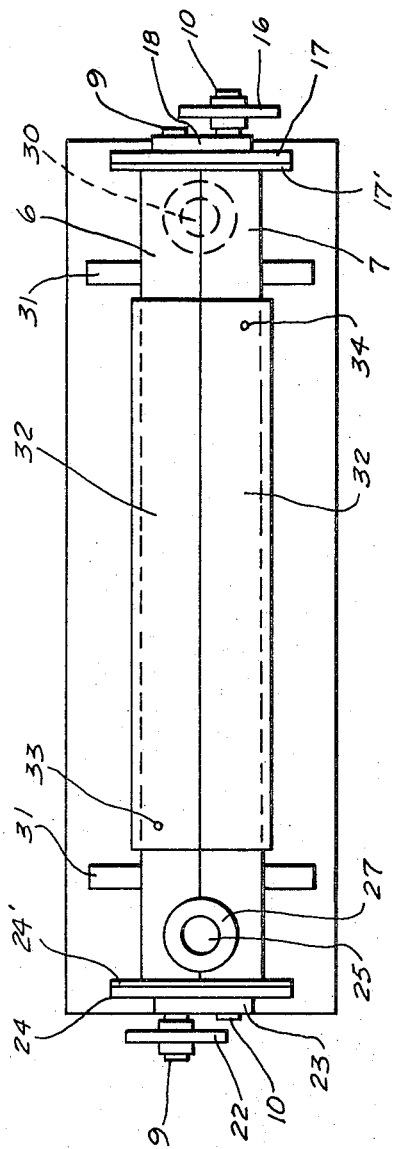
FIG. 2 is a plan view thereof.
Figure 1:
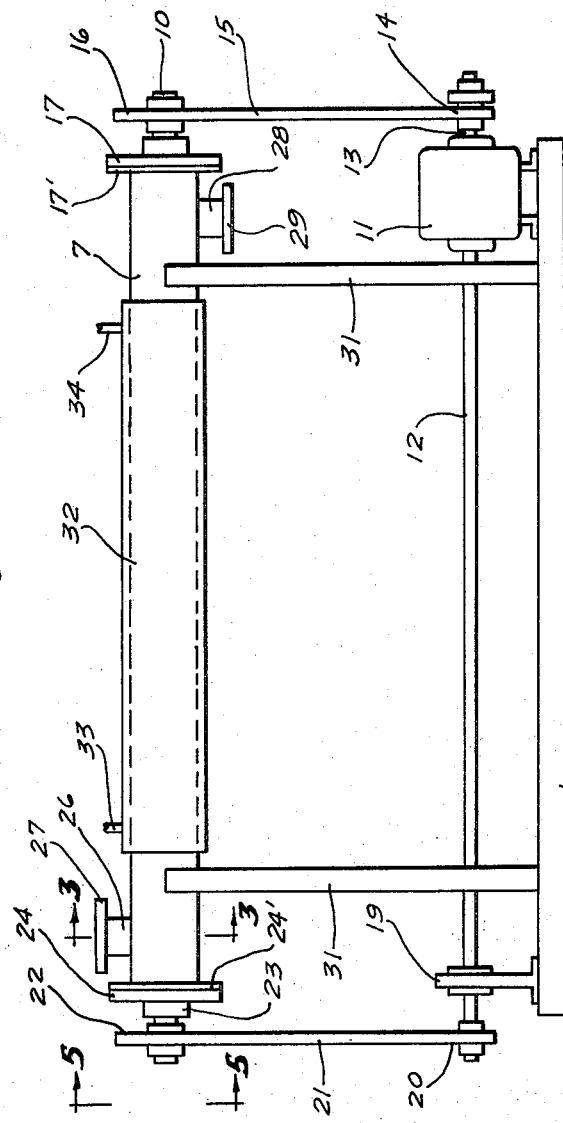
FIG. 1 is a view in side elevation of my improved continuous mixing apparatus.

Referring in detail to the drawings, my improved mixer comprises a tubular casing, which is made up of a pair of partially cylindrical portions 6 and 7. Each of said partially cylindrical portions has about one-fourth of its circumference cut away, said portions 6 and 7 being joined together at their open sides by welding, or in a similar manner, so as to form a continuous closed tubular casing having the two partially cylindrical portions 6 and 7 running lengthwise thereof and meeting or joining in a sharp ridge 8 at both the top and bottom of the casing. Mounted on the axis of the cylindrical portion 6 to rotate about said axis is a shaft 9 and mounted on the axis of the cylindrical portion 7 to rotate about said axis is the shaft 10.

Figure 3:
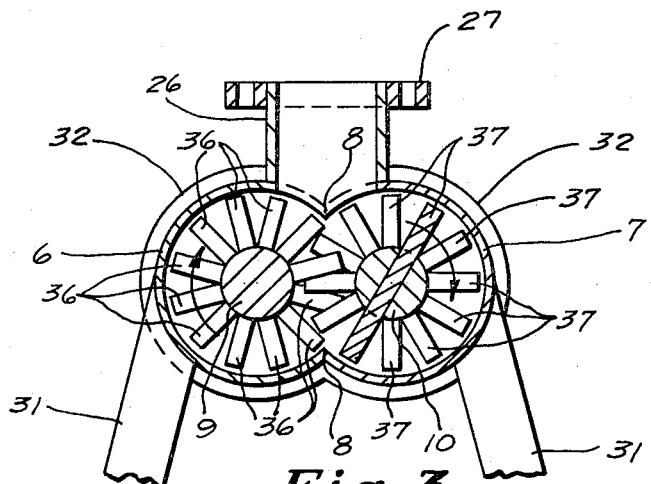
FIG. 3 is a section taken on a line 3—3 of FIG. 1 on an enlarged scale.
Figure 4:
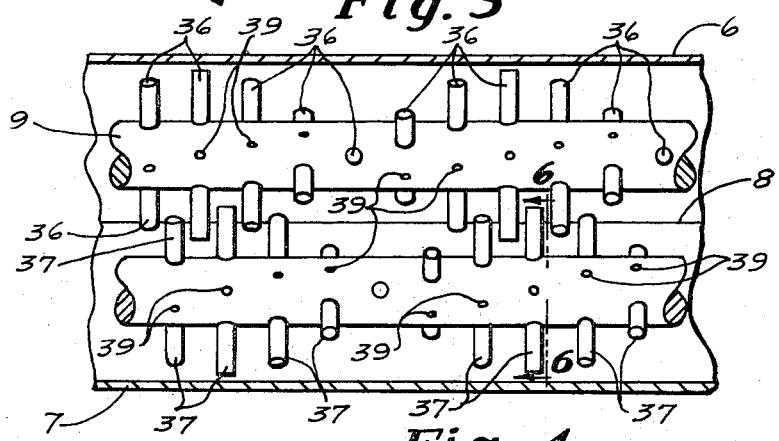
FIG. 4 is a view partly in horizontal section and partly in plan showing a fragmentary portion of the casing and agitating means located therein on a still more enlarged scale.
Figure 5:
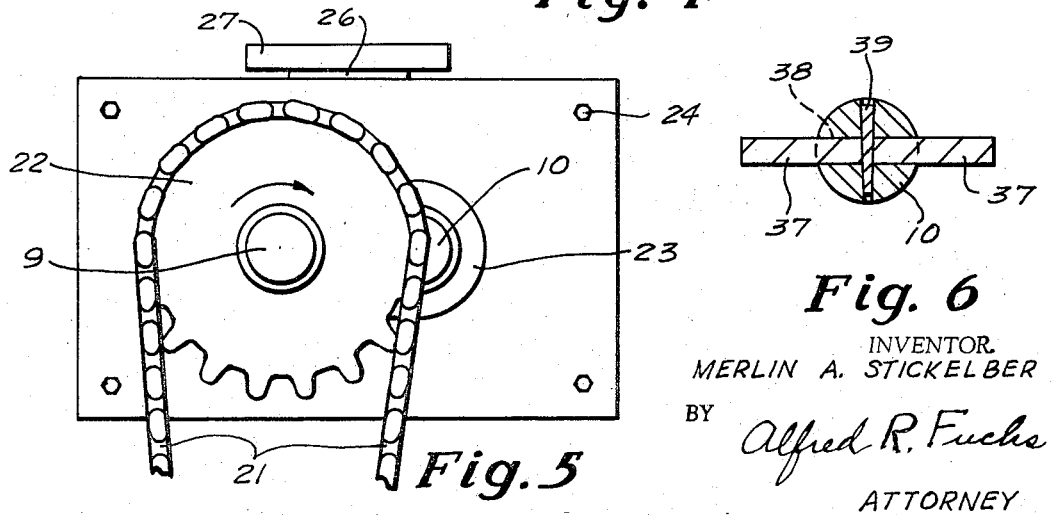
FIG. 5 is a fragmentary view in elevation on an enlarged scale taken on the line 5—5 of FIG. 1.
Figure 6:
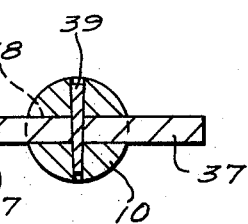
FIG. 6 is a sectional detail view showing the mounting of one of the rods in one of the shafts.

Suitable means is provided for driving the shafts 9 and 10 in the same direction, the direction of rotation being indicated by the arrows in FIG. 3. The driving means for the shafts 9 and 10 may be a motor 11, which is provided with a shaft 12 having a portion 13 extending from the opposite side of the motor 11 from the main body portion of the shaft 12, said shaft portions 12 and 13 being either integral with each other or otherwise connected to rotate as a unit. Mounted on the shaft portion 13 is a sprocket 14 over which the sprocket chain 15 operates, which operates over the sprocket 16 which is mounted on the shaft 10 to rotate therewith, said shaft projecting from the casing at one end thereof, said casing having an end wall 17 and a member 18 provided on the exterior thereof provided with bearings for the shafts 9 and 10. The shaft 12 is provided with a bearing member 19, which is mounted on the base portion 35 of the frame of the machine. A sprocket 20 is mounted on the shaft portion 12 to rotate therewith. A sprocket chain 21 operates over said sprocket 20 and also operates over the sprocket 22 which is mounted on the shaft 9 to rotate therewith. The shafts 9 and 10 are mounted in bearings provided in the member 23 mounted exteriorly of the end wall 24 of the casing. The end walls 17 and 24 are secured fluid tight to flanges 17' and 24' provided on the casing.

An opening 25 is provided in the top of the casing adjacent one end thereof and midway between the sides of the casing. An inlet conduit 26 extends upwardly from the casing at said opening 25 and is provided with a flange 27 for connecting the same with any suitable conduit or conduits for feeding the material to be mixed into the inlet passage formed by the conduit 26 and the opening 25. An outlet connection or discharge conduit 28 provided with a flange 29 for securement to any other suitable conduit or conduits is provided adjacent the opposite end of the casing from the inlet connection, above described, leading from an outlet opening 30 located in the bottom of the casing in a similar manner to the conduit 26 from opening 25 provided in the top of the casing at the inlet end thereof. The casing is mounted on any suitable supporting means such as the frame members 31, extending upwardly from the base 35 and is surrounded through the major portion of its length by a cooling jacket 32, in which may be provided cooling means, such as a direct expansion cooling coil, or other refrigerating means. An inlet 33 for the refrigerant leads into one end of said jacket and an outlet 34 leads from the other end thereof.

The axes of the shafts 9 and 10 are spaced apart approximately one and one-half times the radius of curvature of the casing portions 6 and 7. Mounted on the shaft 9 are radially extending rods 36 and mounted on the shaft 10 are radially extending rods 37. Each of the rods 37 extends diametrically through the shaft 10 with the ends thereof located closely adjacent the cylindrical surface of the casing portion 7. The rods 36 are mounted in the same manner on the shaft 9 and extend with their ends closely adjacent the inner cylindrical surface of the casing portion 6. The spacing of the shafts 9 and 10 and the length of the rods 36 and 37 is such that the rods 36, in passing near the shaft 10, approach the shaft 10 approximately as closely as they approach the inner curved wall portion of the casing portion 6 and, similarly, the rods 37 approach as closely to the shaft 9 as to the curved wall of the casing portion 7. Each of the rods 36 and 37 fits closely in a transverse opening 38 in the shaft, and in order to prevent any movement endwise of themselves relative to the shafts 9 and 10, the rods 36 and 37 are secured in position by means of tapered pins 39 each extending through an opening in each of the rods and through an aligning opening in the shaft on which the rods are mounted.

Preferably the spacing of the ends of the rods from the curved wall portions 6 and 7 is about one-sixteenth of an inch. The rods 36 are spaced from each other longitudinally of the shaft 9 and are arranged so that the projecting portions thereof lie in a spiral path around the shaft 9, the spiral advancing in such a direction that the rotation of the shaft 9 in the direction indicated will advance any material that may be engaged by said rods 36 in a direction from the inlet end of the casing toward the outlet end thereof. The rods 37 mounted on the shaft 10 are similarly mounted and similarly arranged with respect to the shaft 9. However, the rods 37 are staggered relative to the rods 36 so that each of the rods 37 will be mounted midway between a pair of rods 36 when the rods 37 pass between the rods 36 during the rotation of the shafts 9 and 10.

It has been found desirable to make the rotating parts of a very sturdy construction, the rods being preferably about five-eighths of an inch in diameter and the shaft proportionately large in diameter, the approximate relationship of the size of the shafts and the rods being preferably that shown in FIG. 3 of the drawings. It has been found desirable to space the rods 36 and 37 along the shafts so that the clearance between one of the rods 37 and the rods 36 on each side thereof as the rods 37 pass between the rods 36, and vice versa, be about one-eighth inch. It will also be noted that when the shafts 9 and 10 rotate as shown in FIG. 3 the rods 36 projecting from the shaft 9 will be passing downwardly as the rods 37 on the shaft 10 pass upwardly in the area between the shafts 9 and 10 in which the rods 36 and 37 are acting in cooperation with each other to mix and stretch the dough or other similar material that is being acted on thereby. It will also be noted upon reference to FIG. 3 that, when the rods 36 and 37 pass from out of proximity with each other, the ends of the rods 36 pass into adjacency with the curved inner wall of the casing portion 6 and the ends of the rods 37 pass into adjacency with the inner curved portion of the casing portion 7. Accordingly the rods 36 and 37 will be exerting a pulling action on the dough continuously. The pulling action exerted by the cooperative action of the rods 36 and 37 with each other is, however, greater than the pulling action exerted by the rods 36 and 37 in cooperation with the casing portion adjacent which the ends of the rods pass.

While the inlet passage 26 is continuously open and the outlet passage 28 is also continuously open, and flow is continuous through the casing from the inlet to the outlet, suitable means may be provided for collecting the mixed dough or other mixture discharged through the outlet and controlling the discharge thereof into suitable receptacles in a given quantity, should this be desired. Similarly, the inlet connection 26 is ordinarily connected with suitable conduit means to which the various ingredients of the mixture are fed continuously by suitable controlling means.

The sprockets provided in each of the driving means for the shafts 6 and 7 may be so proportioned that said shafts rotate at the same speed or at different speeds. Preferably the sprockets are so proportioned that one of the shafts rotates at a speed that is approximately ten percent greater than that of the other shaft, as this difference in speed appears to cause the rods carried by the shafts in cooperation with each other to exert a greater pulling action on the dough than when both shafts rotate at the same speed.

What I claim is:
1. A continuous dough mixer having an elongated tubular horizontally extending casing having an inlet leading into the same adjacent one end thereof and an outlet leading from the same adjacent the other end thereof, said casing having a pair of partially cylindrical wall portions, said casing being closed except for said inlet and outlet, each of said cylindrical wall portions having the same radius of curvature, said cylindrical wall portions being curved about parallel horizontal axes transversely of said casing and meeting midway of the width of said casing to form inwardly directed opposed longitudinal central ridges on the interior of said casing, along the top and bottom thereof, a shaft extending lengthwise of said casing on each of said axes, rods circular in cross section extending radially outwardly from each of said shafts, said rods being located in a spiral path around said shafts turning in a direction to advance the material in said mixer from said inlet to said outlet upon turning of said shafts, and means for rotating said shafts in the same direction, the rods projecting from each of said shafts being out of transverse alignment with the rods on the other of said shafts and each passing between a pair of rods on the other shaft in adjacency to but out of contact with said rods of said pair, said rods being of such length relative to the spacing of the axes of said shafts that the ends of said rods on each of said shafts move into closely spaced relation to said cylindrical wall portions immediately after leaving their position between a pair of rods on said other shaft and that said rods on each of said shafts move into position between a pair of rods on said other shaft immediately after said ends of the said last mentioned rods move out of closely spaced relation to said cylindrical wall portions, whereby said rods exert a continuous pulling action on the dough while moving said dough from said inlet to said outlet.

2. A continuous dough mixer such as claimed in claim 1 in which the means for rotating said shafts comprises means for driving one of said shafts at a faster rate than the other shaft.

References Cited

UNITED STATES PATENTS

| 297,518 | 4/1884 | Hussey | 259—104 |
| 947,635 | 1/1910 | Darling | 259—104 X |
| 2,306,698 | 12/1942 | Heller | 259—6 |
| 2,630,302 | 3/1953 | Jones | 259—6 |
| 3,164,107 | 1/1965 | Oakes et al. | 259—6 X |

FOREIGN PATENTS

| 119,346 | 7/1947 | Sweden. |

WILLIAM I. PRICE, *Primary Examiner.*

WALTER A. SCHEEL, *Examiner.*

J. M. BELL, *Assistant Examiner.*